United States Patent
Aleksandrovich et al.

(10) Patent No.: US 12,019,601 B2
(45) Date of Patent: Jun. 25, 2024

(54) HORIZONTAL SKIMMING OF COMPOSITE DATASETS

(71) Applicant: YAHOO ASSETS LLC, Dulles, VA (US)

(72) Inventors: George Aleksandrovich, Hoffman Estates, IL (US); Allie K. Watfa, Urbana, IL (US); Robin Sahner, Urbana, IL (US); Mike Pippin, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 161 days.

(21) Appl. No.: 16/727,142

(22) Filed: Dec. 26, 2019

(65) Prior Publication Data

US 2021/0200731 A1 Jul. 1, 2021

(51) Int. Cl.
| | | |
|---|---|---|
| G06F 16/22 | (2019.01) | |
| G06F 16/21 | (2019.01) | |
| G06F 16/242 | (2019.01) | |
| G06F 16/2455 | (2019.01) | |
| G06F 16/2457 | (2019.01) | |

(52) U.S. Cl.
CPC .......... *G06F 16/221* (2019.01); *G06F 16/213* (2019.01); *G06F 16/2445* (2019.01); *G06F 16/2448* (2019.01); *G06F 16/2455* (2019.01); *G06F 16/24573* (2019.01)

(58) Field of Classification Search
CPC ............... G06F 16/221; G06F 16/2445; G06F 16/2455; G06F 16/213; G06F 16/2448; G06F 16/24573
See application file for complete search history.

(56) References Cited

U.S. PATENT DOCUMENTS

| | | | | |
|---|---|---|---|---|
| 4,177,510 A | * | 12/1979 | Appell ................ | G06F 12/1491 711/163 |
| 7,865,503 B2 | * | 1/2011 | Piedmonte ............ | G06F 16/245 707/812 |
| 8,466,919 B1 | * | 6/2013 | Duff ...................... | G06T 17/005 717/124 |
| 9,110,957 B2 | * | 8/2015 | Mital ................... | G06F 16/2465 |
| 9,588,749 B2 | * | 3/2017 | Chen ......................... | G06F 8/64 |
| 10,216,814 B2 | * | 2/2019 | Allan .................... | G06F 16/254 |
| 10,346,421 B1 | * | 7/2019 | Heer ..................... | G06F 16/252 |

(Continued)

OTHER PUBLICATIONS

Authors: Ozgul Unal • Hamideh Afsarmanesh Title: "Semi-automated schema integration with SASMINT" Publisher: Springer/ Dates: Apr. 11, 2009 /Published online: Jun. 19, 2009 p. 105 (Year: 2009).*

*Primary Examiner* — Pierre M Vital
*Assistant Examiner* — Zuheir A Mheir
(74) *Attorney, Agent, or Firm* — James J. DeCarlo; Greenberg Traurig, LLP

(57) ABSTRACT

Disclosed are embodiments for horizontally skimming composite datasets. In one embodiment, a method is disclosed comprising receiving a script, the script including commands to access a composite dataset; pre-processing the script to identify a set of columns; loading a metadata file associated with the composite dataset file; parsing the metadata file to identify one or more datasets that include a column in the set of columns; loading data from the one or more datasets; and executing the script on the one or more datasets.

14 Claims, 9 Drawing Sheets

(56) References Cited

U.S. PATENT DOCUMENTS

| | | | | |
|---|---|---|---|---|
| 10,445,062 B2* | 10/2019 | Oberbreckling | | G06F 7/02 |
| 10,733,198 B1* | 8/2020 | Marschner | | G06F 16/252 |
| 10,997,137 B1* | 5/2021 | Goyal | | G06F 16/248 |
| 11,176,718 B2* | 11/2021 | Gilbertson | | G06T 11/206 |
| 11,727,007 B1* | 8/2023 | Kulkarni | | G06F 16/24553 |
| | | | | 707/769 |
| 2007/0011668 A1* | 1/2007 | Wholey | | G06F 8/34 |
| | | | | 717/151 |
| 2011/0295795 A1* | 12/2011 | Venkatasubramanian | | |
| | | | | G06F 16/254 |
| | | | | 707/602 |
| 2012/0089968 A1* | 4/2012 | Varadarajan | | G06F 9/5033 |
| | | | | 717/136 |
| 2013/0173667 A1* | 7/2013 | Soderberg | | G06T 11/206 |
| | | | | 707/798 |
| 2013/0332449 A1* | 12/2013 | Amos | | G06F 9/44 |
| | | | | 707/714 |
| 2015/0234870 A1* | 8/2015 | Kumar | | G06F 16/13 |
| | | | | 707/807 |
| 2015/0278214 A1* | 10/2015 | Anand | | G06F 16/24578 |
| | | | | 707/748 |
| 2016/0092544 A1* | 3/2016 | Shivarudraiah | | G06F 16/24554 |
| | | | | 707/600 |
| 2019/0065567 A1* | 2/2019 | Griffith | | G06F 16/2282 |
| 2019/0114335 A1* | 4/2019 | Koenig | | G06F 16/211 |
| 2019/0130007 A1* | 5/2019 | Hao | | G06F 17/18 |
| 2019/0332696 A1* | 10/2019 | Chen | | G06F 16/2471 |
| 2020/0026790 A1* | 1/2020 | Maclean | | G06F 16/2282 |
| 2020/0134500 A1* | 4/2020 | Marcé | | G06N 7/08 |
| 2020/0210427 A1* | 7/2020 | Dugan | | G06F 16/24542 |
| 2020/0233905 A1* | 7/2020 | Williams | | G06F 16/904 |
| 2020/0394166 A1* | 12/2020 | Vanhooser | | G06F 16/221 |
| 2020/0409952 A1* | 12/2020 | Dean | | G06F 16/24553 |

* cited by examiner

HORIZONTAL SKIMMING OF COMPOSITE DATASETS

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments relate to distributed data processing and, in particular, to techniques for optimizing input/output (I/O) processing of distributed and composite datasets.

In big data and distributed processing systems such as Hadoop, it is common to amass large data sets based on, for example, high-velocity data such as clickstream data. For downstream processing of such data, it is frequently common to add additional data to the original data sets (referred to as annotating data). In current systems, adding annotations involves a duplication of the original data, forming a new dataset that includes the original data and the new annotation data. For example, annotating clickstream data comprises copying the entire clickstream data set and adding one or more columns to the data set and then populating these new columns with the annotation data. The result is that current systems are required to read and process entire data sets as well as duplicate the same data across additional files. Frequently, current systems perform this copying multiple times as annotations can be added on already annotate data. Thus, if a previously annotate dataset is annotated again, the original data is copied twice, resulting in three copies of the same data.

BRIEF SUMMARY

Access to composite datasets generally involves accessing less than all columns included in the dataset. Thus, some columns are not read as part of a script or command. However, using existing file formats, there is currently no way to reduce file access given that the datasets in a composite dataset are distributed across multiple files and/or machines. Thus, there is a current need in the art to provide a technique for efficiently reducing disk access during the reading of a composite dataset.

The disclosed embodiments solve these and other technical problems by providing a storage layer for a distributed storage system that allows for the creation and access of annotation data layers. In some embodiments, the disclosed embodiments are provided as a storage layer on a Hadoop system, although the disclosed embodiments are not limited to such a system. The various techniques described herein may be implemented as a hybrid file format implemented as a thin wrapper layer on a distributed file system.

In one embodiment, a method is disclosed comprising receiving a script, the script including commands to access a composite dataset; pre-processing the script to identify a set of columns; loading a metadata file associated with the composite dataset file; parsing the metadata file to identify one or more datasets that include a column in the set of columns; loading data from the one or more datasets; and executing the script on the one or more datasets.

In another embodiment, a non-transitory computer-readable storage medium for tangibly storing computer program instructions capable of being executed by a computer processor is disclosed, the computer program instructions defining the steps of receiving a script, the script including commands to access a composite dataset; pre-processing the script to identify a set of columns; loading a metadata file associated with the composite dataset file; parsing the metadata file to identify one or more datasets that include a column in the set of columns; loading data from the one or more datasets; and executing the script on the one or more datasets.

In another embodiment, an apparatus is disclosed comprising: a processor; and a storage medium for tangibly storing thereon program logic for execution by the processor, the stored program logic causing the processor to perform the operations of receiving a script, the script including commands to access a composite dataset; pre-processing the script to identify a set of columns; loading a metadata file associated with the composite dataset file; parsing the metadata file to identify one or more datasets that include a column in the set of columns; loading data from the one or more datasets; and executing the script on the one or more datasets.

DETAILED DESCRIPTION

Figure 1:
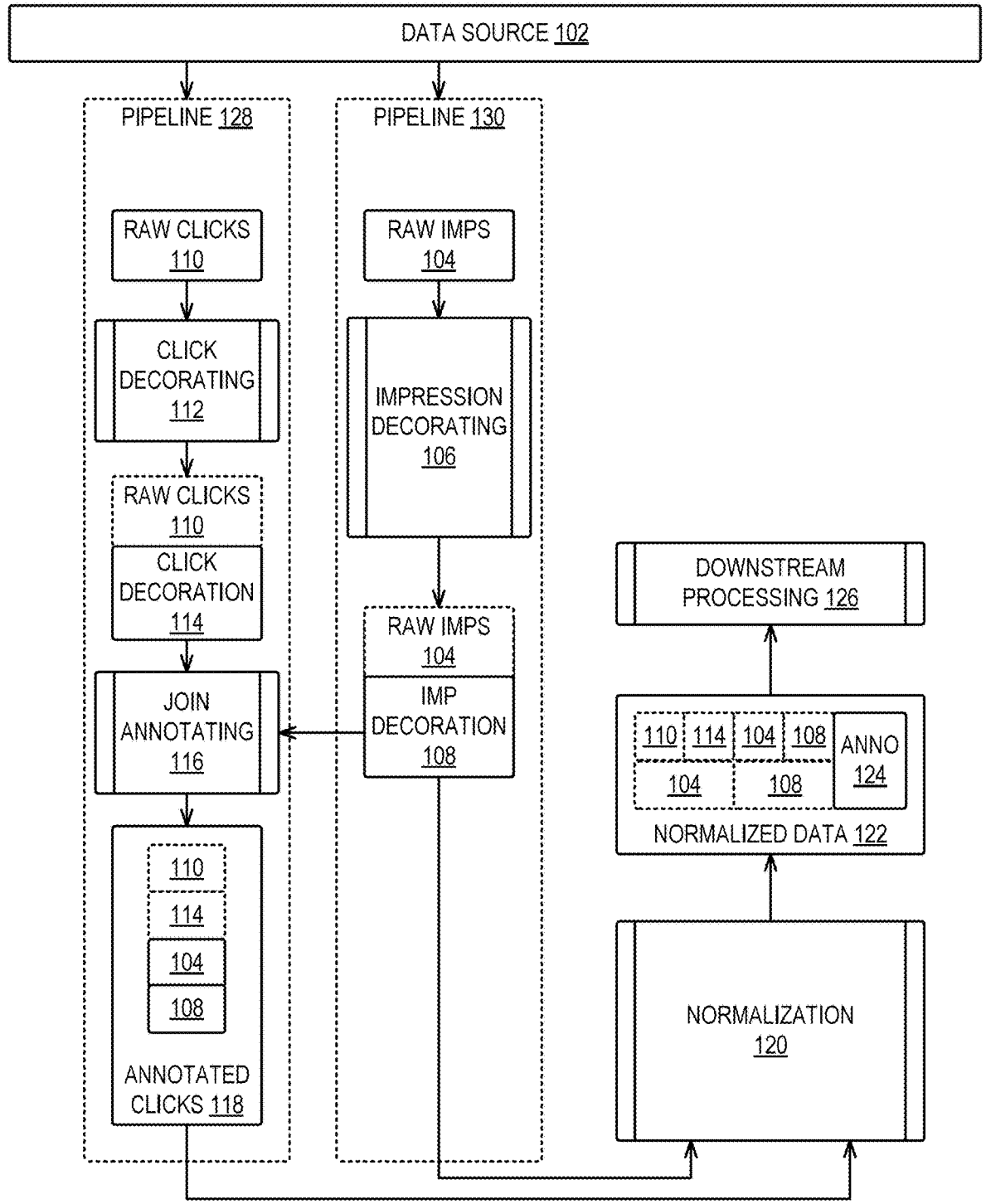
FIG. 1 is a system diagram illustrating a distributed processing system according to some embodiments of the disclosure.

FIG. 1 is a system diagram illustrating a distributed processing system according to some embodiments of the disclosure.

In the illustrated embodiment, a plurality of pipelines (128, 130) process data from a data source (102). In one embodiment, data source (102) can comprise a data lake or similar big data storage device. In the illustrated embodiment, the data source (102) can include a large volume of unstructured data. In some embodiments, the data source (102) can include structured data such as column-oriented data. In some embodiments, the data source (102) can comprise log file data storage or similar types of storage. In some embodiments, the data source (102) stores data in structured filetypes such as Orc or Parquet filetypes.

In the illustrated embodiment, the pipelines (128, 130) comprise distributed processing pipelines. Each pipeline (128, 130) may comprise a plurality of distributed computing devices. In one embodiment, each pipeline (128, 130) can read data from the data source (102), process the data, and load the data into a structured data repository. In some embodiments, all of the above processing may be done in a distributed computing environment running on commodity hardware (e.g., a Hadoop cluster or similar cluster).

The illustrated pipelines (128, 130) further illustrate an annotation workflow. As used herein, annotation refers to the processing of stored data to add new data or supplement the data with existing data. Data to be annotated is referred to as raw data or a raw data set. Additions to the raw data are referred to as annotated data. A combination of raw data and annotated data is referred to as composite data.

In the pipeline (130), raw impression data (104) is received. The use of impression data is provided as an example, and other data types may be used. The embodiments place no limit on the underlying type of data processed herein. The raw impression data (104) can refer to data regarding the display of content in webpages (e.g., the time viewed, the owner of the content, etc.). Raw impression data (104) is generally amassed via log files that log the selection and display of content. In the illustrated embodiment, the raw impression data (104) can comprise a plurality of database columns and rows. In some embodiments, this data can be stored in Orc, Parquet, or other column-oriented data formats.

The raw impression data (104) is processed during an impression decorating stage (106). In the illustrated embodiment, the impression decorating stage (106) can comprise a Pig or Hive script or other similar data processing script. Generally, the impression decorating stage (106) performs one or more operations on the raw impression data (104). For example, the impression decorating stage (106) can add additional columns to the raw impression data or can alias column names.

The output of the impression decorating stage (106) is an impression annotation data set, also referred to as a decorated impression data set (108). As illustrated, the impression decorating stage (106) does not copy the raw impression data (104) to a new location. Instead, the raw impression data (104) is locally processed. That is, the impression decorating stage (106) can comprise a distributed algorithm that is run on the same device that is storing the raw impression data (104). In contrast, however, the decorated impression data (108) is written to disk after being created. In the illustrated embodiment, the decorated impression data set (108) comprises a set of columns capturing only the new data to decorate the raw impression data. The decorated impressions (108) and raw impressions (104) are accessed by pipeline (128) to annotate a clickstream further, as described herein.

Similar to the pipeline (130), pipeline (128) receives raw click data (110). In one embodiment, raw click data (110) can comprise data regarding user selection of digital content. For example, while raw impression data (104) can include rows for each time a piece of content is displayed on a web page, raw click data (110) can include rows for each time that content is selected by a user.

Similar to the impression decorating stage (106), the click decorating stage (112) adds one or more columns or fields to the raw data. As in stage (106), the click decorating stage (112) generates these additional columns for fields as a physically distinct file (114). Thus, the click decorating stage (112) does not modify or copy the raw click data (110) when generating the decorate click data (114).

In the illustrated embodiment, a join annotating stage (116) receives the raw click and impression data (110, 104) and the decorated clicks and impressions (114, 108). In some embodiments, the join annotating stage (116) copies the impression data (104, 108) to form the annotated clicks data set (118). In one embodiment, the join annotating stage (116) filters the impression data (104, 108) to identify only that impression data relevant to the click data (110, 114) and uses the filtered data as an annotation set to generate the annotated clicks.

In the illustrated embodiment, a normalization stage (120) is configured to receive the combined impression composite data set (104, 108) and the composite annotated clicks data set (118). In one embodiment, the normalization stage (120) is configured to add a further annotation to the composite data sets. For example, the normalization stage may perform grouping or sorting of the data as well as synthesized columns based on aggregations of the underlying data. As a result, the normalization stage (20) generates a normalized annotation data set (122). As illustrated, only the annotations (124) are written to disk during this stage, and the remaining data (104, 108, 110, 114) is not copied to a new location on disk.

Finally, the normalized annotation data set (112) is provided to downstream processing applications for analysis, further processing, and storage, as required by such applications. As indicated in the figure via dotted lines, data sets in the pipelines are not copied during the annotation phases. The result is that the normalized data (122) can include the annotation results of the pipeline (128, 130) stages, the normalization annotations, and the raw underlying data without incurring the computationally expensive copying costs required by existing solutions. Specific methods for avoiding this unnecessary copying are described in more detail herein in the context of a distributed computing platform such as Hadoop.

Figure 2A:
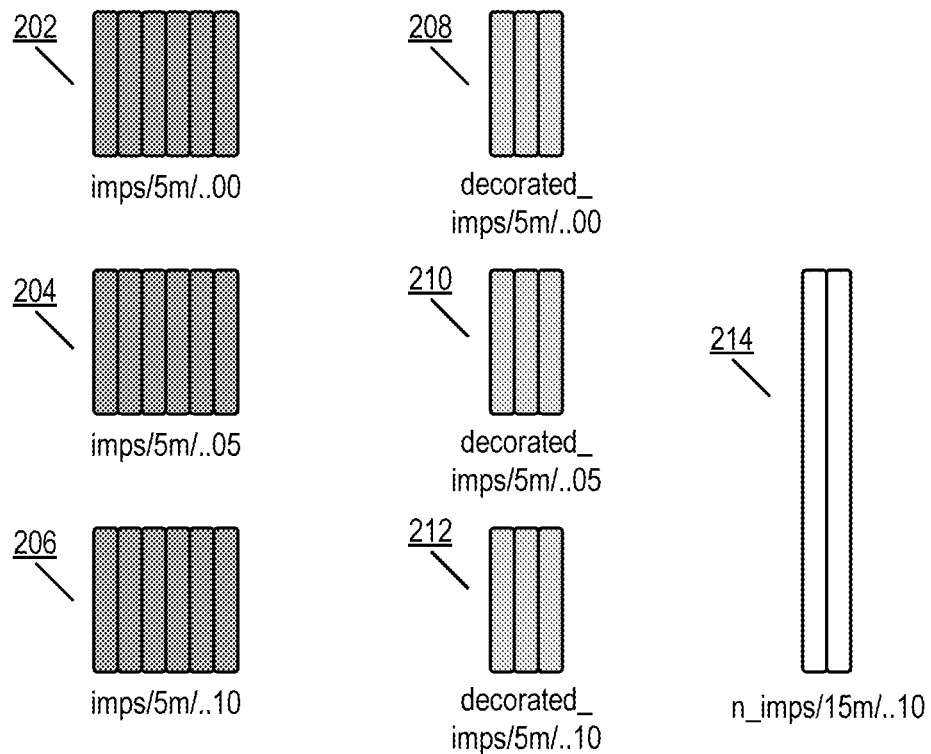
FIG. 2A illustrates the physical storage layout of a distributed processing system according to some embodiments of the disclosure.

FIG. 2A illustrates the physical storage layout of a distributed processing system according to some embodiments of the disclosure.

In the illustrated embodiment, a set of rows and columns representing raw data is stored at three locations (202, 204, 206). As one example, these locations (202, 204, 206) can comprise three physically distinct storage devices storing a portion of the entire data set represented by the portions. In one embodiment, each location (202, 204, 206) comprises a file, and each file can be stored on the same or different computing devices.

In addition to raw data (202, 204, 206), decoration data is stored in three locations (208, 210, 212). Similar to locations (202, 204, 206), the decoration data is stored in individual files stored on the same or different computing devices. Notably, the decoration data is stored in files separate from the raw data.

Finally, the second level of annotation data is stored at location (214). Again, this location comprises a separate file from the previous locations (202 through 212). Thus, each set of annotations is stored in physically separate files or other structures. Further, there is no limitation on the mapping of the number of files between raw data and annotations. As illustrated, raw data is stored in three files at three locations (202, 204, 206).

Similarly, second level annotation data is also stored in three files at three locations (208, 210, 212). However, the final layer of annotation data is stored in a single file at one location (214). To facilitate this, each annotation structure includes a row identifier that is described in more detail in the application Ser. No. 16/727,060.

Figure 2B:
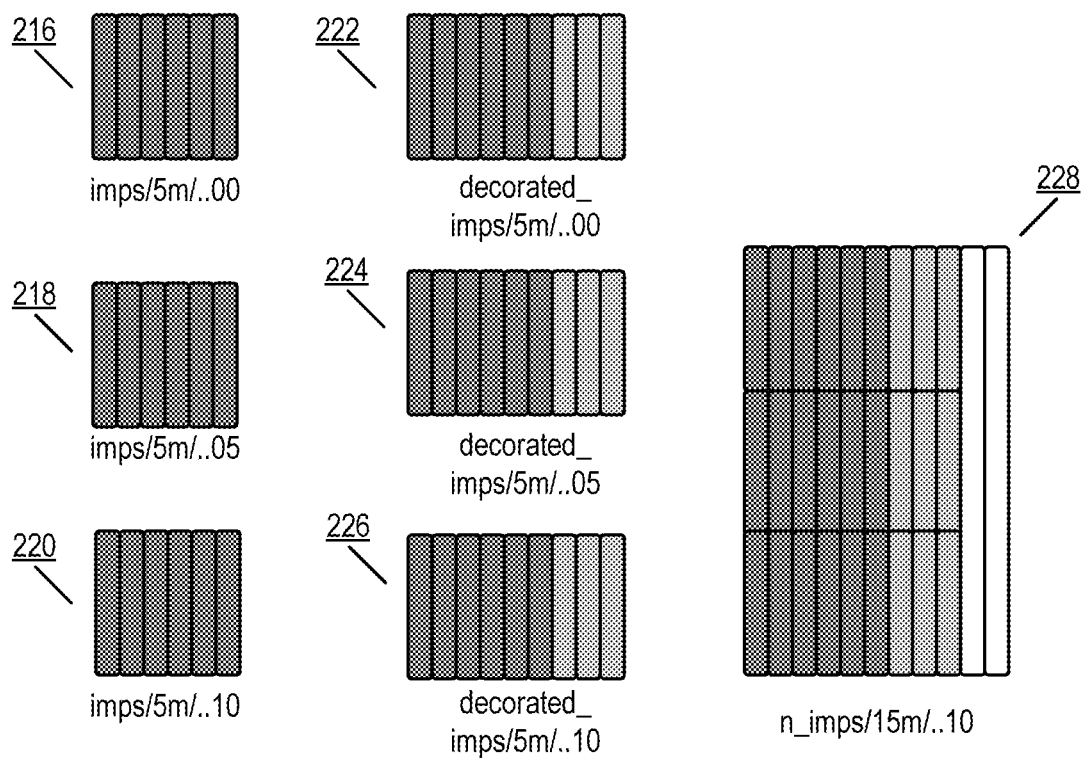
FIG. 2B illustrates the logical storage layout of a distributed processing system according to some embodiments of the disclosure.

FIG. 2B illustrates the logical storage layout of a distributed processing system according to some embodiments of the disclosure.

The illustrate storage layout comprises a logical view of the same data depicted physically in FIG. 2A. The illustrated view represents the view of data presented to downstream applications accessing the annotation data sets. In the illustrated embodiment, raw data sets are stored at first locations (216, 218, 220), first annotations are stored at second locations (222, 224, 226), and a third annotation is stored at a third location (228). When accessing the first annotations (222, 224, 226), a downstream processing algorithm accesses both the annotations (e.g., 208) and the raw data (e.g., 202) when accessing the second location (222). Further, when accessing the third location (228), the entire annotation data set appears as a single logical data set while comprising separate physical files.

Figure 3A:
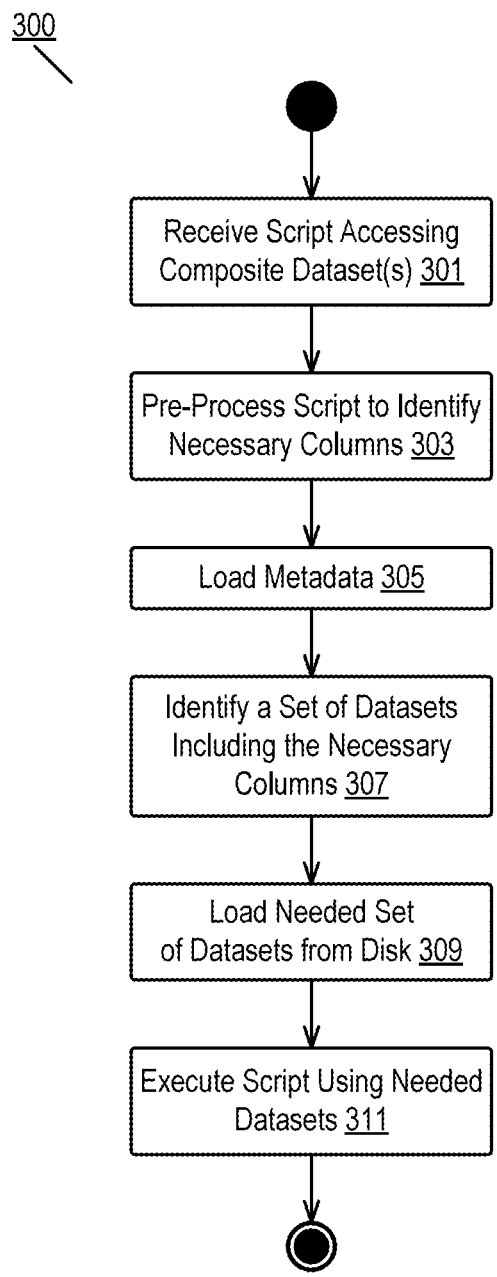
FIG. 3A is a flow diagram illustrating a method for pruning unused columns from a composite dataset according to some embodiments of the disclosure.

FIG. 3A is a flow diagram illustrating a method for pruning unused columns from a composite dataset according to some embodiments of the disclosure.

In step 301, the method (300) receives a script that accesses one or more composite datasets. In the illustrated embodiment, a script may comprise a Pig, Hive, or similar type of script. In some embodiments, the script accesses composite datasets via a LOAD or similar command.

In step 303, the method (300) pre-processes the script to identify necessary columns.

In some embodiments, the method (300) analyzes the content of the script to identify which columns appear in the script. In some embodiments, this can be done by parsing the script itself. In other embodiments, the method (300) can parse an intermediate representation of the script. For example, in some embodiments, the method (300) can convert the script into a directed acyclic graph (DAG) that represents the script. After generating the DAG, the method (300) can access the DAG to identify columns used during the operations in the script.

In step 305, the method (300) loads metadata associated with the composite datasets.

Figure 3B:
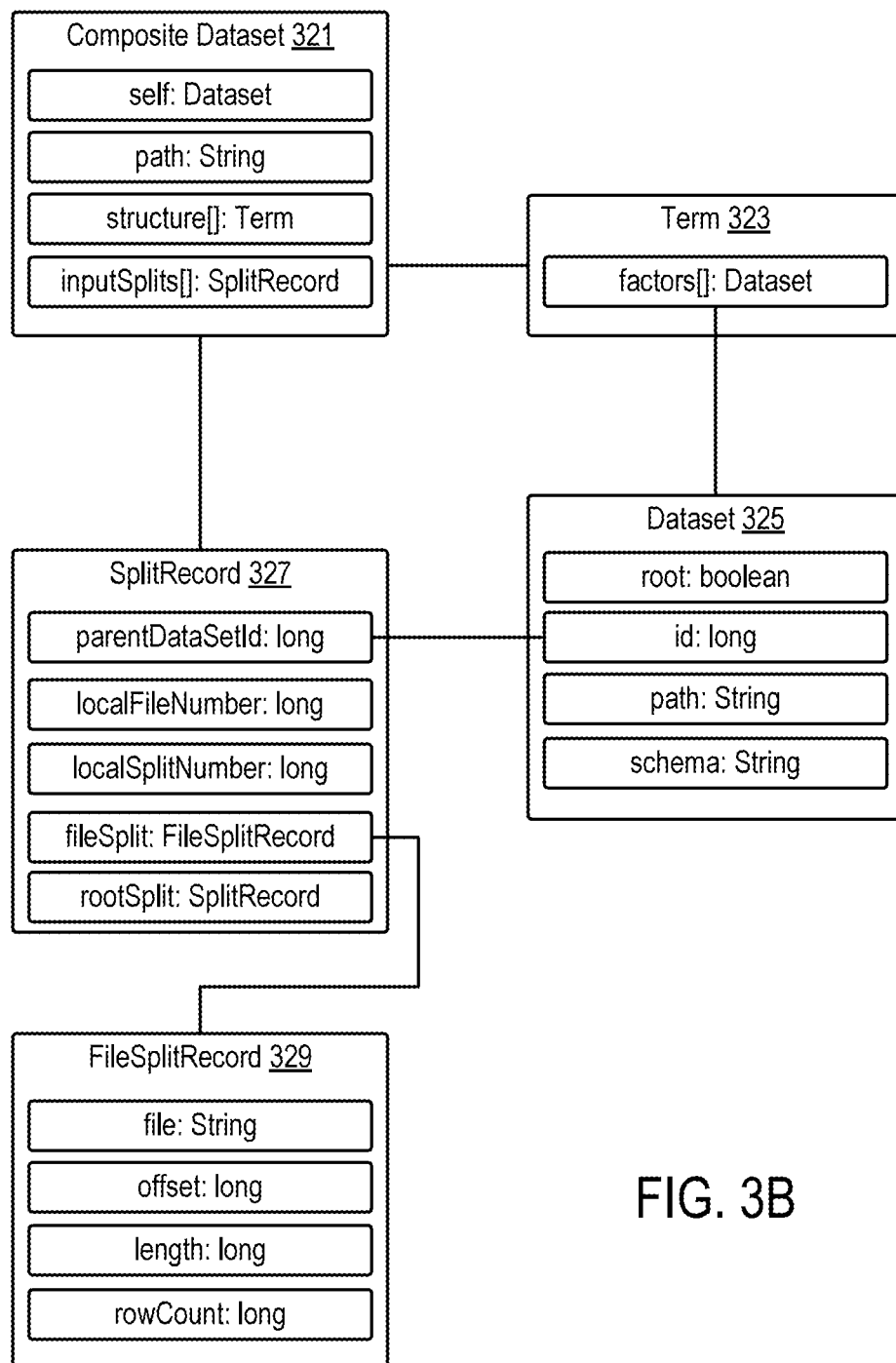
FIG. 3B is a class diagram illustrating a metadata object for a composite dataset according to some embodiments of the disclosure.

In some embodiments, the metadata is structured as depicted and described in FIG. 3B. In some embodiments, the method (300) retrieves metadata associated with one dataset that forms the composite metadata. For example, a composite dataset may include datasets X, Y, and Z, where Z is the most recently added dataset. In this embodiment, the method (300) may retrieve the metadata associated with dataset Z. This metadata, as described in FIG. 3B, includes the relationships of the entire composite dataset in the form of an array of factors and associated schemas.

In step 307, the method (300) identifies a set of datasets that include the necessary columns.

The following listing illustrates an exemplary metadata file for a composite dataset:

```
{
"dataSets": [ {
  "id": "X",
  "index": 0,
  "format": "ORC",
  "path": "/system/target/output/unsorted/raw",
  "schema":
    {
      "type":"record",
      "name":"root",
      "fields":[
      {"name":"line_id","type":["null","long"],"default":null},
      {"name":"impressions","type":["null","long"],"default":null}
      ,
          {"name":"clicks","type":["null","long"],"default":null}
      ]
    }
}, {
  "id": "Y",
  "index": 1,
  "format": "ORC",
  "path": "/system/target/output/unsorted/annotated",
  "schema": {
    "type":"record",
    "name":"root",
    "fields":[
    {"name":"line_id_orig","type":["null","long"],"default":null
    },
    {"name":"imp_per_click","type":["null","long"],"default":null}
    ]
  }
}]}
```

A description of the generation of such a metadata file is described in related application Ser. Nos. 16/727,172 and 16/727,219.

As illustrated, two datasets are included as representing the composite dataset (shortened to X and Y, although the format of the id parameter is not limited to single characters). Dataset X includes the columns: line_id, impressions, and clicks. Dataset Y includes the columns: line_id_orig and imp_per_click.

In one embodiment, as part of step 307, the method (300) deserializes the metadata and extracts the dataset schemas, including column names. The method (300) will then identify those datasets having at least one column that was identified in step 303. The method (300) then stores these matching dataset identifiers for further processing.

In step 309, the method (300) loads the needed set of datasets from disk. In the illustrated embodiment, the needed set of datasets comprises those datasets identified in step 307 that include at least one needed column. In one embodiment, the method (300) further accesses the metadata to identify the file path ("path" property) of the dataset and uses this path to load the underlying dataset.

In step 311, the method (311) executes the script received in step 301 using only the needed datasets. In some embodiments, the method (300) loads the data stored in the files loaded in step 309 and combines the resulting rows into a composite dataset object. The method (300) then proceeds to execute the commands in the original script on this composite dataset object built using a minimal set of columns.

FIG. 3B is a class diagram illustrating a metadata object for a composite dataset according to some embodiments of the disclosure.

In the illustrated embodiment, a composite dataset is represented by an object (321). This object (321) is then serialized to generate a metadata file for a given composite dataset. In some embodiments, the object (321) can be serialized into a binary format. In other embodiments, the object (321) can be serialized into a text format (e.g., JavaScript Object Notation (JSON)).

The composite data set object (321) includes a "self" property that comprises a dataset object (discussed in connection with 325). This "self" property represents inter alia the structure of the actual annotation data and storage mechanics. In some embodiments, the properties in a dataset object (e.g., 325) may be flattened into top-level properties of the composite dataset object (321).

The composite data set object (321) additionally includes a path property. The path property represents the location of the given composite dataset on disk and may comprise a relative or, more commonly, an absolute path. In addition to the self and path properties, the composite dataset object (321) may further include various properties such as an identifier that uniquely identifies the dataset in the system. The composite data set object (321) may also include a file count property that represents the number of files constituting the composite dataset. The composite data set object (321) may include a property identifying the number of splits per file and a property identifying the number of rows per split.

The composite data set object (321) additionally includes an inputSplits property. This property comprises an array of SplitRecord objects (described in connection with element 327). This array of SplitRecord objects describes the splits associated with each dataset.

As illustrated, the composite data set object (321) also includes a structure property that represents the flattened, algebraic representation of the composite dataset, described above. The structure property comprises a set of terms (323) that define the structure of the composite dataset. Each term is a summand in the algebraic representation and contains a dataset element for each factor (described in connection with element 325). In the example depicted in FIG. 3A, the structure property would include three terms: X1·Y·Z, X2·Y·Z, and X3·Y·Z In the illustrated embodiment, a term (323) includes a factors property. The factors property comprises an array of dataset objects (e.g., 325). In the example, depicted in FIG. 3A the term X1·Y·Z would include three factors of X1, Y, and Z.

Each dataset is represented by a dataset object (325). A dataset comprises a directory in the grid storage of the distributing computing environment. In some embodiments, the dataset objects may be normalized such that only one unique copy of a dataset object is stored in the class. In the example in FIG. 3A, only five dataset objects would be instantiated: X1, X2, X3, Y, and Z. Each dataset object (325) has a root property which indicates whether the dataset is a root or annotation dataset. If true, the dataset comprises the first factor in a term and is used to identify the starting point of the summands. The dataset object (325) additionally includes an identifier (id) property that comprises a unique identifier for the dataset and a path property that identifies the location (absolute or relative) of the dataset on disk. The id is created as a hash using the absolute path to the data and the current time.

The dataset object (325) additionally includes a schema property. In some embodiments, the schema property will include the column names and associated data types for the dataset. In alternative embodiments, the schema property includes only the column names for the dataset. In some embodiments, the schema property comprises a JSON string. In some embodiments, the schema may be in the Avro data format.

As discussed above, the composite dataset object (321) includes a splits property that includes one or more SplitRecord objects. Each SplitRecord object includes details regarding the splits of a given dataset, as described in more detail herein.

A SplitRecord object (327) identifies the details of splits within a given dataset. In some embodiments, a split refers to a file-based split object or a stripe-based split object and generally includes a subset of the total rows of a given dataset. As illustrated, a SplitRecord object (327) includes a parentDataSetId property that identifies the dataset the SplitRecord is associated with. The SplitRecord object (327) includes a fileSplit property that comprises a FileSplitRecord object (329). The fileSplit property represents details generated when implementing a file-based split operation. Alternatively, the fileSplit property may comprise a stripe split property. As illustrated, the FileSplitRecord object (329) includes a file property (identifying the location of the file), an offset property (identifying the offset of the contents of the file in the overall data), a length property (identifying the length of the data in the file), and a rowCount property (identifying the number of rows in the file).

The SplitRecord object (327) additionally includes localFileNumber and localSplitNumber properties. These properties represent the corresponding file number and split number, respectively, for a given SplitRecord. In some embodiments, the SplitRecord object (327) may include further properties describing the details of a given file split or stripe split. In some embodiments, this parameter can refer to an object, including the location of the file/stripe, offset, length, row count and other details regarding the format of the underlying storage.

Finally, the SplitRecord object (327) includes a rootSplit property that comprises a FileSplitRecord object (329). The rootSplit property represents a split record for the root dataset to which this split is aligned. For a root dataset, this property is set to null.

Figure 4A:
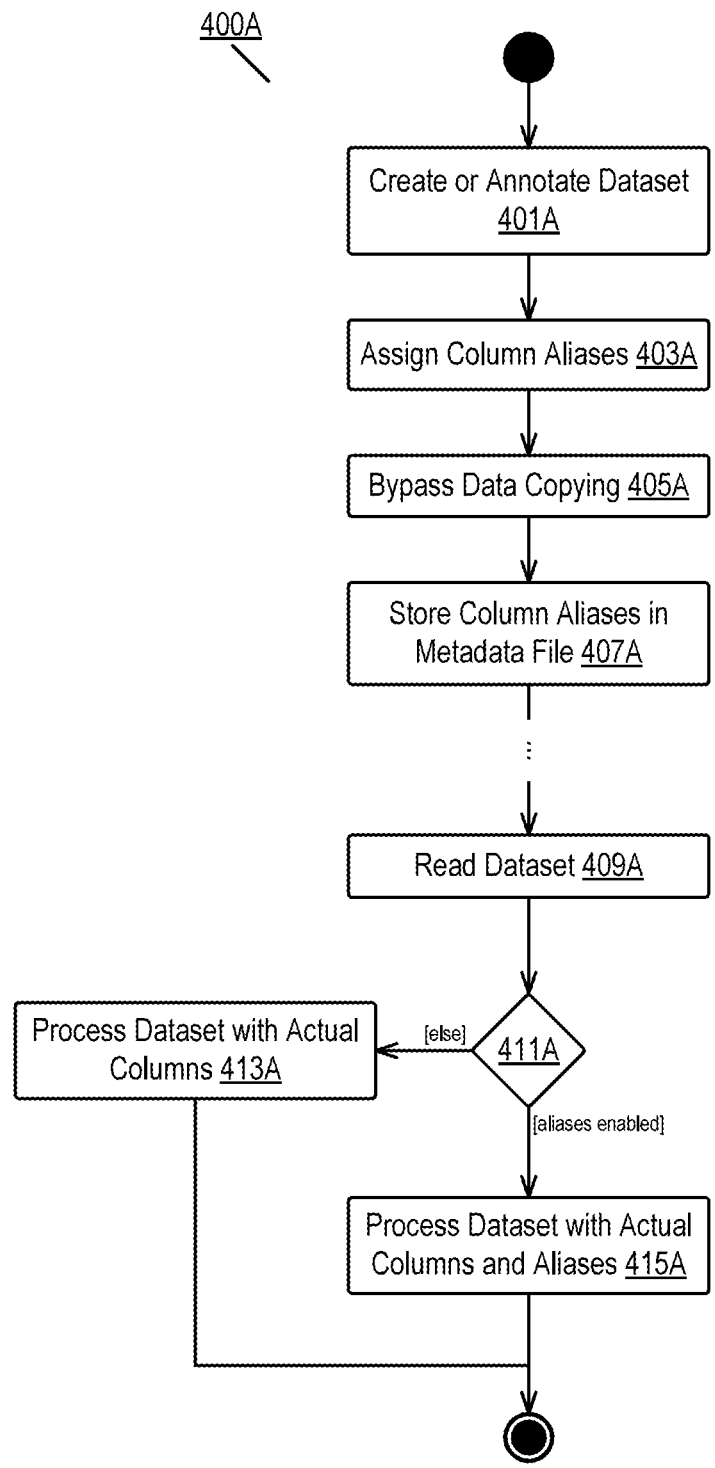
FIG. 4A is a flow diagram illustrating a method for aliasing columns in a composite dataset according to some embodiments of the disclosure.

FIG. 4A is a flow diagram illustrating a method for aliasing columns in a composite dataset according to some embodiments of the disclosure.

In step 401a, the method (400a) creates or annotates a dataset. In one embodiment, the method (400a) can be implemented as part of the creation of a dataset or part of the annotation of a dataset (i.e., creating an annotation dataset). Generally, the method (400a) is implemented during both operations.

In step 403a, the method (400a) assigns column aliases to the new dataset. In one embodiment, the method (400a) assigns column aliases by passing the column aliases to a creation or annotation user-defined function (UDF). Examples of user-defined functions include such functions in the Pig programming language.

As one example, multiple aliases may be passed to the UDF as a parameter
   addAliases: {
      column1: ["alias1", "alias2", "alias3" ],
      column2: ["alias4", "alias5", "alias6" ]
      . . .
   }
In the illustrated embodiment, columns 1 and 2 are aliased to various alias column names (e.g., "alias1"). In one embodiment, the method (400a) validates the aliases to ensure that a single alias is not mapped to the same column. In one embodiment, the alias syntax further supports the ability to specify a dataset containing the column. Thus, if column1 supra was located in dataset X, the method (400a) would support identifying the column parameter as "X.column1: . . . " In some embodiments, the method (400a) may allow users to specify which dataset the alias column should be written to.

In step 405a, the method (400a) bypasses data copying for the aliased columns. During this step, any data written to either dataset excludes the writing of any data to the column aliases.

In step 407a, the method (400a) stores the column aliases in a metadata file. In some embodiments, this metadata file may be the same as the metadata file discussed previously. In the illustrated embodiment, the method (400a) can add an additional field to the serialized object that stores column aliases, as depicted above.

In step 409a (after storing the metadata), the method (400a) reads the dataset from disk. As described previously, in one embodiment, the method (400a) reads the metadata file before accessing the datasets. In these embodiments, the method (400a) can access the metadata alias data stored in step 407a.

In step 411a, the method (400a) analyzes the returned metadata to determines if aliases are enabled. In some embodiments, this comprises determining whether the aliases property is set in the metadata file. In some embodiments, the method (400a) may validate the aliases before step 411a.

In step 413a, the method (400a) processes the dataset using actual columns storing data upon determining that no columns are aliased. As described elsewhere, this process comprises loading data from multiple datasets to disk, aligning the data, and returning the data as a composite dataset.

Alternatively, in step 415a, the method (400a) processes the dataset using both actual and aliased columns. In some embodiments, step 415a includes the same processing as performed in step 413a. That is, the method (400a) loads the relevant datasets into memory for processing. However, in step 415a, the method (400a) further supports aliased columns. In general, users will access aliased columns identically to actual columns. Thus, user-supplied scripts may include operations that utilize aliased columns. To support this, the method (400a) creates and maintains a private mapping of alias names to actual columns. In some embodiments, the method (400a) pre-processes the script to rewrite any references to any alias to the actual column names. In some embodiments, the method (400a) may further validate that the script is processable. For example, in some embodiments, the method (400a) may only allow read access to aliases. This is because the aliases are mapped to other columns, and a user may attempt to write to an alias with the assumption that the actual column value does not change. In this scenario, the method (400a) pre-processes the script to determine if any command modifies the value at an aliased column. If so, the method (400a) may throw an exception and end processing.

Figure 4B:
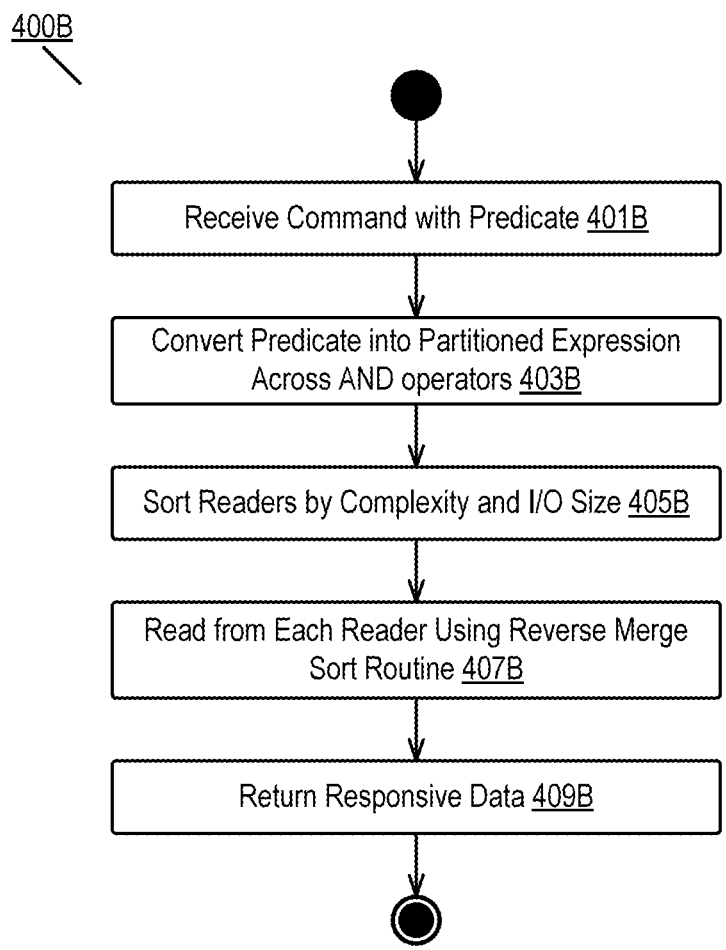
FIG. 4B is a flow diagram illustrating a predicate push down procedure implemented on a composite dataset according to some embodiments of the disclosure.

FIG. 4B is a flow diagram illustrating a predicate push down procedure implemented on a composite dataset according to some embodiments of the disclosure.

One of the performance-oriented features of ORC and other columnar stores is their ability to eliminate needless I/O by pushing filters down to the storage layer. For example, if the very first statement in a Pig script is a filter to eliminate non-US accounts, an ORC reader can eliminate any file split where there are no US accounts. One of the ways that this is accomplished is by the ORC format keeping summary statistics on individual columns and using it to prune stripes from reading. Other methods involve keeping indexes on columns so that records can be efficiently skipped.

The ORC implementation of predicate push down support is embedded deep within the ORC reader classes which causes it to skip records that would fail the predicate. To the caller of the reader class, there is no feedback to indicate to the caller that rows have been skipped. So, for example, if the reader was configured to read with a predicate such as "region='US'" and pointed to a file split with 3 physical stripes A, B, and C, for which Stripe B was known to contain no records with a US region, then the reader would silently skip over stripe B without reading a single row, but rather only inspecting the statistics and index metadata of the column. From the caller's viewpoint, the last row of A may be followed by the first row of C as if stripe B never existed.

However, the above implementation is difficult to implement in the context of a composite dataset that includes multiple files accessed in row order. Specifically, when accessing a composite dataset, if a given reader skips one or more rows the multiple datasets will be stitched together incorrectly, resulting in malformed data. Similarly, if a given reader returns zero results (bypassing stripes based on predicate matching) while another reader returns data, an exception will be raised. Relatedly, when accessing a distributed composite dataset, a given reader will only have access to columns that are stored in the file being accessed. Thus, if a predicate relies on columns not in that file, the predicate will not be able to be used as a filter. The method illustrated in FIG. 4A provides a predicate push down implementation in the context of a distributed composite dataset.

In step 401b, the method (400b) receives a command containing a predicate. In one embodiment, this command comprises a structured command such as Pig or Hive command. Pig commands are provided solely as examples. In general, a predicate refers to a condition on the command that modifies the query in some manner. For example, predicates are often found in WHERE clauses of SQL and SQL-like statements. One example, provided above, is the condition WHERE region='US' which limits the resulting output to those rows having a value of 'US' in the 'region' field.

In step 403b, the method (400b) converts the predicate into a partitioned expression across AND operators.

In the illustrated embodiment, the method (400b) transforms a predicate into an expression having the form:

$e_1$ AND $e_2$ AND . . . AND $e_n$ AND other where, for any dataset $x_i$, $e_i$ is an expression containing only column references to dataset $x_i$, and other is any remaining expression that cannot be so expressed.

If the original predicate does not contain any reference to columns in a dataset, that corresponding dataset expression may be set to a constant Boolean value (e.g., true). In the illustrated embodiment, this transformation is always possible, since other can simply be set to the original predicate and each $e_i$ can be set to true. The performance boost that the method (400b) can achieve is related to how many components of the original predicate can be "factored" out of the Boolean expression into one of the subexpressions. In some embodiments, only the "visible" columns should be considered. For example, in composite dataset X·Y·Z, if dataset X contained column A and dataset Z contained column A, then by definition, column A must be sourced from dataset Z. Therefore, a predicate expression involving A cannot be factored into the expression for dataset X. Column aliases would also need to be resolved, as described in FIG. 4A. In the illustrated embodiment, each partitioned expression is associated with a single dataset and thus a single reader.

In one embodiment of step 403*b*, a single predicate factoring method may be implemented. In this embodiment, if dataset $x_1$ contains the columns A, B, and C, then expression $e_1$ may only contain references to columns A, B, and C. Any reference to another column would invalidate it. In this embodiment, the algorithm for factoring will simply compare the predicate to each dataset. If the entire predicate can be supported by the contributing columns of a dataset, then the entire predicate should be assigned to that dataset. If no such dataset may be found, then the predicate should be left entirely within other. If the predicate does qualify for a dataset, the predicate should be transformed into the format of the underlying data file format.

In another embodiment, a general factoring algorithm may be used to implement step 403*b*. A general factoring algorithm may be employed when the expressions in the underlying language are generally unary or binary (e.g., as with the Pig language).

A description of one general factoring algorithm is as follows. In the following description, for a current logical split, let $x_i$ be the ith dataset that contributes to the requested tuple and let $cols_i$ be the array of columns that dataset $x_i$ will be contributing to the requested tuple. This forms a partition of the columns, in that for a single logical split, every column will be contributed from exactly one dataset. This is not true globally, only in the context of a single logical split. If a reader is processing multiple splits, the algorithm may have to be executed again if the partitioning of the columns changes.

In this embodiment, the method (400*b*) first parses the expression into an expression evaluation tree. Next, the method (400*b*) performs a transformation on any subtrees with the pattern NOT (A OR B) into (NOT A) AND (NOT B). This moves the Boolean trees into more of an AND tree than an OR tree. Next, the method (400*b*) factors the expression into an array of AND'd subexpressions by exploding from the root. If the root of the tree is not an AND, then the result is an array containing a single expression. Otherwise the method (400*b*) proceeds recursively from the root capturing all of the expressions that are AND'd from the root. The method (400*b*) then obtains an array of subexpressions (s) and an AND'd expression of every subexpression of s where the columns found in that subexpression are a subset of the columns in $cols_i$ (denoted as $e_i$). In other words, start with dataset $x_1$ and set z to be an empty array. Then loop through each subexpression $s_j$ in s and compare the columns in $cols_1$ and $s_j$. If $s_j$ only references columns found in $cols_1$, then add $s_j$ to z and continue to the next subexpression. In some embodiments, $s_j$ can be removed from s at this point. Once every subset is scanned, let $e_1$ be the expression that is the logical AND of each subexpression added to z. If z was empty, then $e_1$ can be set to always true. Clear z and repeat for dataset $x_2$ and so forth or until s is empty, which means the remaining expressions are true. Any expressions left in s cannot be pushed down, and thus can be stored in other.

In the preceding description, various transform algorithms are used to replace elements in a predicate expression. Exemplary transform algorithms are provided below but should not be construed as limiting the algorithm to a specific transform method.

In the transform algorithm for replacing NOT (A OR B) with (NOT A) AND (NOT B), let X be a node in the expression tree with X.operation being the operation. If the operation is NOT then let X.left be the target of the NOT. If the operation is OR or AND let X.left and X.right be the left and right parts of the operation. In this case, the function may have pseudocode as follows:

```
Function Node recursePushToAND(Node X) {
    IF (X.operation==NOT && X.left.operation==NOT) {
        // Simplify NOT(NOT(A)) and return to caller
        X=recursePushToAND(X.left.left);
        return X;
    }
    IF (X.operation==NOT && X.left.operation==OR) {
        // Create a new AND node with NOT X.left.left and NOT
        X.left.right
        Node node=new Node(AND);
        Node.left=new Node(NOT);
        Node.left.left=X.left.left;
        Node.right=new Node(NOT);
        Node.right.left=X.left.right;
        // replace X in parent by returning
        X=node;
    }
    // Only recurse deeper if X is an AND
    IF (X.operation==AND) {
        X.left=recursePushToAND(X.left);
        X.right=recursePushToAND(X.right);
    }
    return X;
}
```

The result of this algorithm is that any NOT OR that can be reached by traversing the predicate via an AND operation will be transformed. Since only an AND may be factored, this increases the range in which the factoring operation can be performed.

In the transform algorithm for factoring an AND predict, the following pseudo-code algorithm may be used:

```
function recurseFactor(Node X, List results) {
    IF (X.operation==AND) {
        // operation is AND, factor left and right into results.
        recurseFactor(X.left, results);
        recurseFactor(X.right, results);
    } else {
        // operation is not an AND, no further factors.
        results.add(X);
    }
}
List factors=new List( );
recurseFactor(predicate, factors);
```

The result of this algorithm is that every subtree of the given expression tree that is reachable through an AND from the root of the tree will be added to the factors list. Because only AND nodes are traversed and the AND operation is commutative, the original predicate can thus be expressed as the multiple AND operation over all of the factors.

In step 405*b*, the method (400*b*) sorts the readers associated with each dataset based on the complexity of the expressions and input/output size.

For expression complexity, in some embodiments, all readers with non-default predicate expressions precede readers with non-default expressions. That is, the filtered datasets (having actual predicate expressions on their columns) are read before the non-filtered dataset readers (having always true expressions). In a data format such as ORC, the expense is incurred in block reads when an entire stripe or row group of selected columns is read, and this is done only after the first row from the stripe is requested. If the method (400*b*) determines that a stripe is not necessary because a filtered reader returns no rows, it can avoid any I/O on the remaining non-filtered datasets. For I/O size, the datasets may be placed in order of the smallest required I/O to the largest required I/O. In some embodiments, this is performed by computing the sum of stripe column sizes. In this way, a read from a smaller file will always precede the read from a larger one, which may get pruned. If an entire stripe is to be pruned, the method (400b) can determine this by reading the smallest file first.

In some embodiments, determining the exact bytes of I/O to be read may in itself be expensive as the stripe info must be read from the end of the file which is in itself an IO operation. In such embodiments, a good proxy for each reader would be a linear estimate of byte size of each column as this information is all known from the metadata ahead of time. In this manner, the estimated I/O can be computed using the following formula:

$$\text{estimated } I/O = \frac{(\text{split length}) * (\text{columns to read})}{\text{total columns}}$$

In step 407b, the method (400b) reads from each of the readers (i.e., each dataset) using a reverse merge sort routine.

In one embodiment, the reverse merge sort routine can be implemented as follows. Using a split object that the reader was initialized with, each reader reads the first row identifier in the split. Then, starting with the readers in the order determined in step 405b, inspect the next available row and extract the row identifier from the row identifier components. If the reader has a non-default predicate and returns no rows (i.e. it is empty), the method (400b) may terminate as there are no matching rows in this filtered reader and thus this split will produce no further rows. Otherwise, the method (400b) compares the reader's current row identifier with the split's expected row identifier. If these are identical, the method (400b) proceeds to the next reader in the filtered partition. If the reader row identifier is less than the expected one, the method (400c) advances the reader and compares again until the reader matches or exceeds the split's expected row identifier. The method (400b) then continues to the next reader on a match. If the row identifier is greater, then the method (400b) advances the split's expected row identifier to match this row identifier and start the algorithm over with the first reader again. This looping continues until the next available row identifier from each reader agrees with the split's expected row identifier or one of the readers becomes empty and the routine terminates early. Once all of the readers agree on the next available row identifier, this means that this row is eligible to be returned. Next, the method (400b) extracts columns and assembles the columns into the final output tuple. Each reader may then be advanced to the next record. The full predicate can be evaluated on the final tuple at this point and returned to the caller, otherwise, the routine in step 407b restarts to get the next eligible record.

In step 409b, the method (400b) returns the resulting data to the calling process.

Figure 4C:
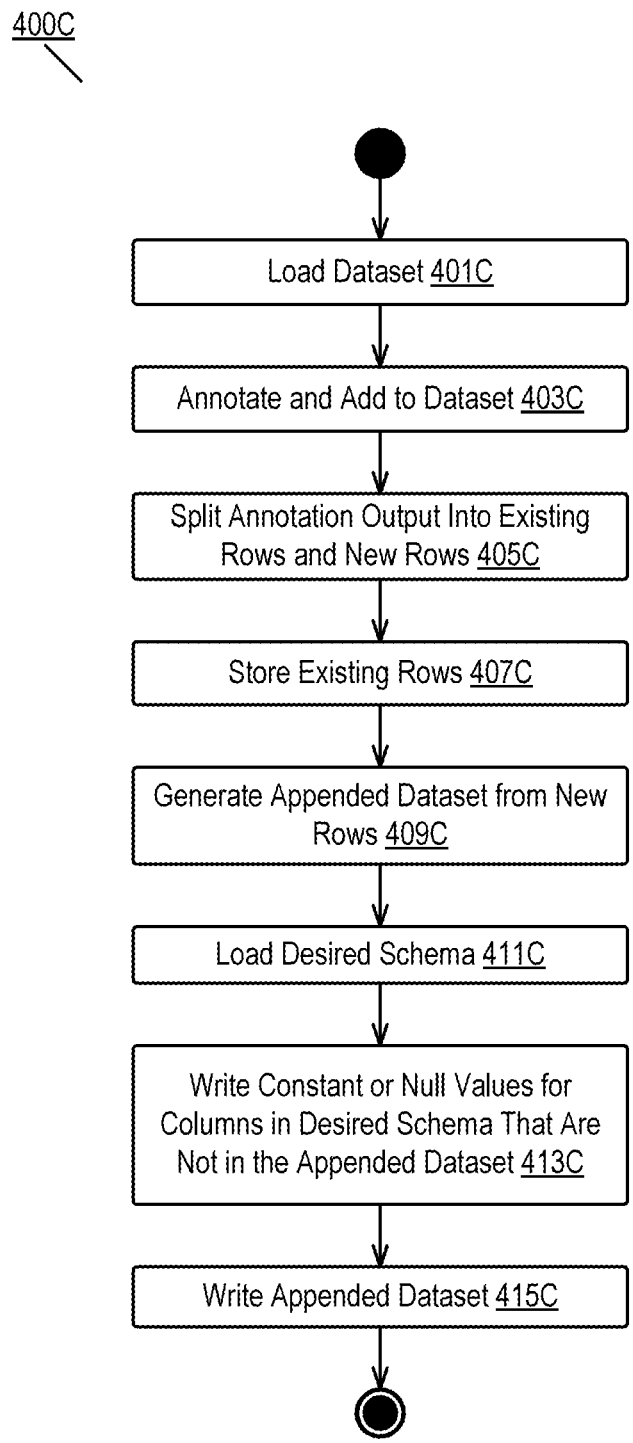
FIG. 4C is a flow diagram illustrating a method for providing derived column support in a distributed processing system according to some embodiments of the disclosure.

FIG. 4C is a flow diagram illustrating a method for providing derived column support in a distributed processing system according to some embodiments of the disclosure.

In step 401c, the method (400c) loads a dataset. In some embodiments, the method (400c) can load either a root dataset or an annotation dataset. In the illustrated embodiment, the dataset loaded in step (401c) includes a set of rows, each of the rows including a row identifier.

In step 403c, the method (400c) annotates the dataset. As described in detail above, this process includes adding one or more additional columns to the loaded dataset. In the illustrated embodiment, the method (400c) also adds data to the annotated dataset. In one embodiment, adding data comprising adding one or more rows of data. In the illustrated embodiment, the one or more rows may only include data for the newly added columns.

As one example, a loaded dataset may include columns A, B, C, D, and E. The processing in step 403c may add columns F and G as an annotation dataset. Further, the method (400c) may add new rows supplying values for columns D, E, F, G while omitting any value for columns A, B, and C.

In step 405c, the method (400c) splits the output of the processing into a set of existing rows and a set of new rows. In the illustrated embodiment, the method (400a) performs this split by identifying those rows that are missing a row identifier. In one embodiment, row identifiers are added upon creation (i.e., writing) of a dataset. Thus, if a row identifier is missing, this indicates that the row is new data. Conversely, if a row identifier is present, the method (400a) can determine that the row was previously stored and is thus not being annotated.

In step 407c, the method (400c) stores the existing rows. In one embodiment, the method (400c) stores all columns of the existing rows. In the illustrated embodiment, this storage may be performed as described throughout the specification.

In step 409c, the method (400c) generates an appended dataset from the new rows. In one embodiment, the method (400c) extracts one or more columns from the original dataset and uses these columns as the appended dataset. In general, all rows in the appended dataset include values for each column. Thus, in the preceding example, the appended dataset may include columns D, E, F, and G.

In step 411c, the method (400c) loads the desired schema. In some embodiments, an end-user provides the schema. In other embodiments, the method (400c) can load the schema from a metadata path supplied by the end-user. In some embodiments, the method (400c) automatically uses the input schema corresponding to the pre-annotation dataset loaded in step 401c. Thus, continuing the example, the schema may identify columns A, B, C, D, and E. In some embodiments, after loading the input schema, the method (400c) merges the input schema with the schema of the appended dataset to form the desired schema. In the previous example, the input schema of (A, B, C, D, E) is merged with the appended dataset schema (D, E, F, G) to generate the desired schema of (A, B, C, D, E, F, G).

In step 413c, the method (400c) writes constant (or null) values to any columns in the desired schema that not in the schema of the appended dataset. In this step, a full row of values is created despite the appended dataset only including values for certain columns. In the preceding example, an example of such a row may comprise the values (null, null, null, 1, 2, 3, 4) where the values 1-4 correspond to values for columns, D, E, F, and G during the processing step of 403c. By contrast, ignored columns A, B, and C are assigned a null (or, in some embodiments, constant) value. Generally, since the writing of null or a constant value is optimized in most storage engines, the automatic setting of such values incurs little performance penalties.

In step 415c, the method writes the appended dataset to disk. Details of writing a dataset are provided elsewhere and are not repeated herein.

In a related embodiment, an author of a dataset may wish to produce a useful metadata file without adding any new columns. For example, given a set of twelve 5-minute feeds, the author would like to publish an hourly rollup. In this case, the embodiments provide a command-line utility to produce a grid path with only a metadata file that references prior feeds. For example, a command having the form:

union (<glob> (<glob> ( . . . ))) <dest> where <glob> is a file system glob pattern that matches one or more directory paths containing metadata files and <dest> is a path where the utility will create an empty annotation that creates a row union of the matching paths.

Upon execution, the command executes a method including the following steps. First, each glob on the command line is expanded into a set of paths (X). Then, for each path X, the metadata from that path is read. Next, a new composite dataset Y is constructed with no physical file splits, only empty references. The dataset Y will have a schema that is the union of the schemas of X. Finally, the destination path is created and the metadata for dataset Y is written into it.

During this operation, there are multiple error conditions that may be checked. First, if the destination directory already exists or cannot be created, the command fails. Second, if the schemas are not compatible, the command fails. Third, if any references are duplicated, the command fails. For example, if the command is given arguments "A B C" and B is an annotation of A or if A and B share a common root dataset, then the operation will fail.

In this manner, the embodiments additionally support the creation of empty annotation datasets.

Figure 6A:
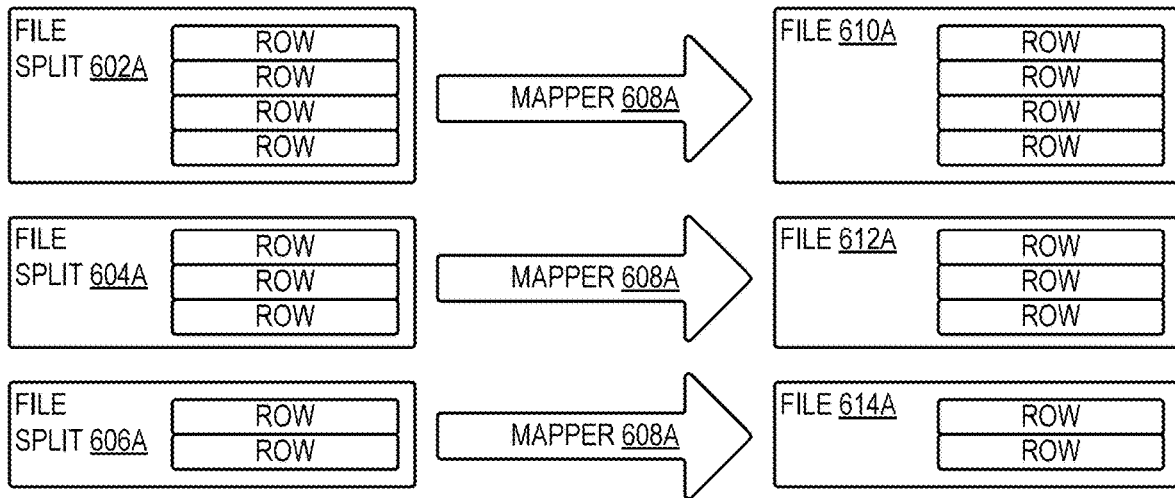
FIG. 6A is a diagram illustrating a mapping process performed in a distributed computing environment using a file-based alignment scheme according to some embodiments of the disclosure.

FIG. 6A is a diagram illustrating a mapping process performed in a distributed computing environment using a file-based alignment scheme according to some embodiments of the disclosure.

In one embodiment, the illustrated dataset comprises a root dataset, although composite datasets may also be read. Multiple physical files may be read when reading a dataset. As illustrated in FIG. 6A, a dataset is split based on file boundaries into three files (602a, 604a, 606a), each file containing a set of rows. In one embodiment, the system forces the distributed file system to split data based on file boundaries.

The system can generate an annotation dataset using a single mapper. As known in the art, mapper tasks are distributed to data nodes of a Hadoop system. The system causes the system to distribute the map task (608a) to each data node containing the files (602a, 604a, 606a). The map task (608a) is configured to operate on a single file. As described previously, the map task (608a) annotates the rows of a given file (602a, 604a, 606a) and generates annotation row identifiers for the resulting annotation dataset. In the illustrated embodiment, the writing is mapper only: no reduce phase is required to generate the output files (610a, 612a, 614a). In some embodiments, a reducer phase can be implemented if needed by the underlying ETL instructions. If a reducer phase (not illustrated) is included, a separate final partition reducer stage is needed.

The system generates annotation dataset metadata. In one embodiment, this may be performed by a reducer task. In one embodiment, the metadata describes the annotation dataset. The metadata may include structural metadata, split coordination metadata, and a schema. In some embodiments, the metadata for a given annotation set is stored in a file separate from the underlying data.

In general, the output annotation dataset is composed of horizontal and vertical unions of raw datasets. In some embodiments, each annotation dataset is assigned a unique identifier (e.g., a 64-bit identifier). Structural metadata provides the ID of the annotation dataset that the metadata describes as well as the ID's of the datasets from which the annotation dataset is constructed and how those sets are combined with one another. The split coordination metadata describes how the annotation data file is split. In the illustrated embodiment, the split coordination metadata includes a fixed-length array that enumerates all splits in the dataset. In the illustrated embodiment, elements of the array include a relative path name followed by a start and length that covers the entire file. In one embodiment, the schema metadata may comprise a list of columns added via the annotation dataset.

Further detail on metadata files for annotation datasets is provided in co-pending U.S. patent application Ser. No. 16/727,142.

The system writes the annotation dataset to disk. As illustrated, the output of the map task (608a) comprises files (610a, 612a, 614a), including rows representing the annotation data. Thus, as a final stage, the mappers (608a) write the annotation datasets to the files identified in the metadata file. Alternatively, if reducer stages are implemented, the reducer may write the files.

Figure 6B:
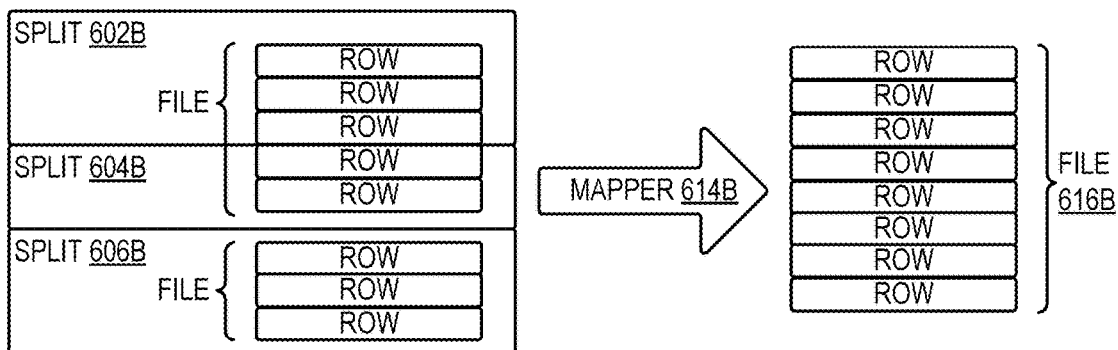
FIG. 6B is a diagram illustrating a mapping process performed in a distributed computing environment using a stripe-based alignment scheme according to some embodiments of the disclosure.
Figure 6B:
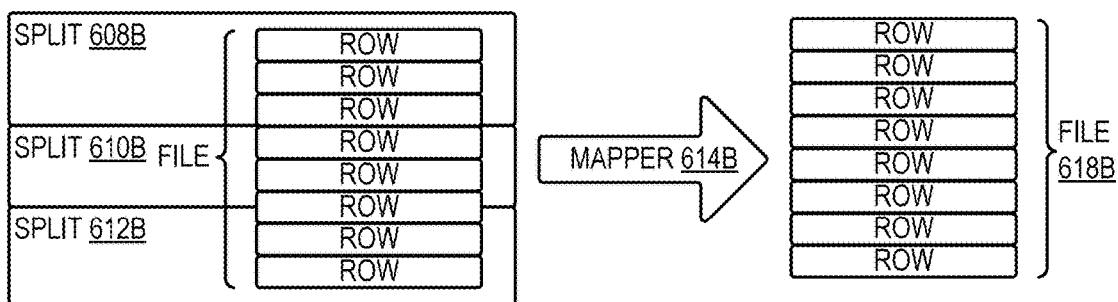

FIG. 6B is a diagram illustrating a mapping process performed in a distributed computing environment using a stripe-based alignment scheme according to some embodiments of the disclosure.

The system reads a dataset. In one embodiment, the dataset comprises a root dataset, although composite datasets may also be read. Multiple physical files may be read when reading a dataset. As illustrated in FIG. 6B, a dataset is split based on stripe boundaries into six splits (602b, 604b, 606b, 608b, 610b, 612b), each split containing a set of rows. Although described using stripes, RowGroups or other similar constructs may be used. As illustrated, a given file may span splits (e.g., 602b, 604b).

The system selects a set of stripes from a given dataset. In some embodiments, the system may select a preconfigured number of stripes based on system requirements (e.g., a preferred stripe length for output data). As illustrated in FIG. 6B, the resulting stripes may span multiple files. Thus, a stripe-based alignment mechanism enables a reduced number of data files for an annotation dataset since decisions are premised on stripes rather than files.

The system generates an annotation dataset using a single mapper. As known in the art, mapper tasks are distributed to data nodes of a Hadoop system. The system causes the system to distribute the map task (614b) to each data node containing the stripes (602b, 604b, 606b, 608b, 610b, 612b). The map task (614b) is configured to operate on a set of stripes in one or more splits. As described previously, the map task (614b) annotates the rows of a given split (602b, 604b, 606b, 608b, 610b, 612b) as well as generates annotation row identifiers for the resulting annotation dataset. In the illustrated embodiment, the writing is mapper only, but reducer phases may be added as described previously in connection with FIG. 6A.

The system generates annotation dataset metadata. In one embodiment, this may be performed by a reducer task. In one embodiment, the metadata describes the annotation dataset. The metadata may include structural metadata, split coordination metadata, and a schema, as described in the description of FIG. 6A. In contrast to the metadata generated in FIG. 6A, the split coordination metadata would include more entries containing file paths but would include smaller lengths and non-zero starting locations indicating stripe boundaries.

The system writes the annotation dataset to disk. As illustrated, the output of the map task (614b) comprises files (616b, 618b), including rows representing the annotation data. Thus, as a final stage, the mappers (614b) write the annotation datasets to the files identified in the metadata file. Alternatively, if reducer stages are implemented, the reducer may write the files.

Figure 5:
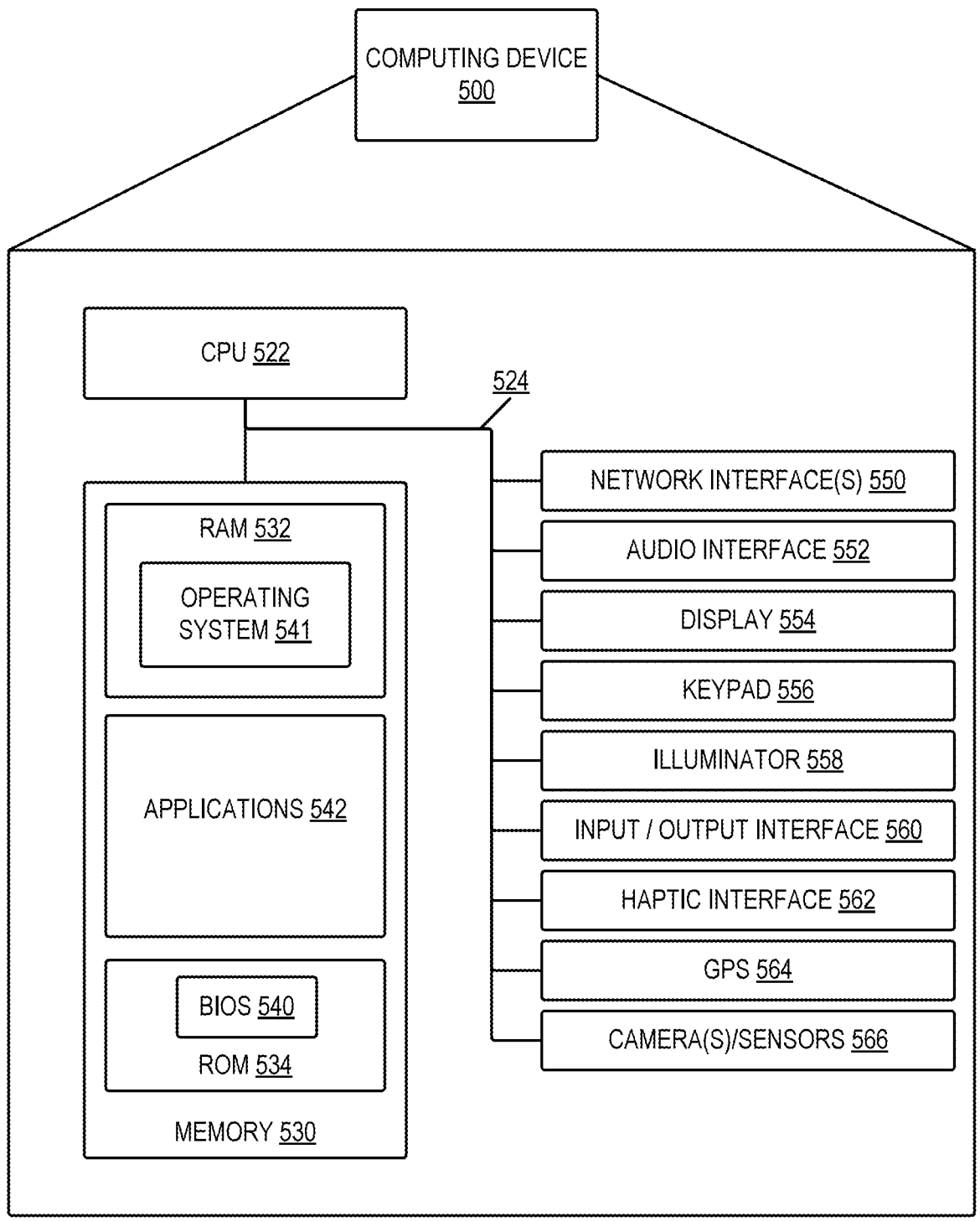
FIG. 5 is a schematic diagram illustrating a computing device showing an example embodiment of a client or server device that may be used within the present disclosure.

FIG. 5 is a schematic diagram illustrating a computing device showing an example embodiment of a client or server device that may be used within the present disclosure.

The computing device (500) may include more or fewer components than those shown in FIG. 5. For example, a server computing device may not include audio interfaces, displays, keypads, illuminators, haptic interfaces, GPS receivers, cameras, or sensors.

As shown in the figure, the device (500) includes a processing unit (CPU) (522) in communication with a mass memory (530) via a bus (524). Computing device (500) also includes one or more network interfaces (550), an audio interface (552), a display (554), a keypad (556), an illuminator (558), an input/output interface (560), a haptic interface (562), an optional global positioning systems (GPS) receiver (564) and a camera(s) or other optical, thermal, or electromagnetic sensors (566). Device (500) can include one camera/sensor (566), or a plurality of cameras/sensors (566), as understood by those of skill in the art. The positioning of the camera(s)/sensor(s) (566) on the device (500) can change per device (500) model, per device (500) capabilities, and the like, or some combination thereof.

The computing device (500) may optionally communicate with a base station (not shown), or directly with another computing device. Network interface (550) is sometimes known as a transceiver, transceiving device, or network interface card (NIC).

The audio interface (552) is arranged to produce and receive audio signals such as the sound of a human voice. For example, the audio interface (552) may be coupled to a speaker and microphone (not shown) to enable telecommunication with others and/or generate an audio acknowledgment for some action. Display (554) may be a liquid crystal display (LCD), gas plasma, light emitting diode (LED), or any other type of display used with a computing device. Display (554) may also include a touch-sensitive screen arranged to receive input from an object such as a stylus or a digit from a human hand.

Keypad (556) may comprise any input device arranged to receive input from a user. Illuminator (558) may provide a status indication and/or provide light.

The computing device (500) also comprises input/output interface (560) for communicating with external. Input/output interface (560) can utilize one or more communication technologies, such as USB, infrared, Bluetooth™, or the like. The haptic interface (562) is arranged to provide tactile feedback to a user of the client device.

Optional GPS transceiver (564) can determine the physical coordinates of the computing device (500) on the surface of the Earth, which typically outputs a location as latitude and longitude values. GPS transceiver (564) can also employ other geo-positioning mechanisms, including, but not limited to, triangulation, assisted GPS (AGPS), E-OTD, CI, SAI, ETA, BSS, or the like, to further determine the physical location of the computing device (500) on the surface of the Earth. In one embodiment, however, the computing device (500) may through other components, provide other information that may be employed to determine a physical location of the device, including, for example, a MAC address, Internet Protocol (IP) address, or the like.

Mass memory (530) includes a RAM (532), a ROM (534), and other storage means. Mass memory (530) illustrates another example of computer storage media for storage of information such as computer-readable instructions, data structures, program modules or other data. Mass memory (530) stores a basic input/output system ("BIOS") (540) for controlling the low-level operation of the computing device (500). The mass memory also stores an operating system (541) for controlling the operation of the computing device (500)

Applications (542) may include computer-executable instructions which, when executed by the computing device (500), perform any of the methods (or portions of the methods) described previously in the description of the preceding Figures. In some embodiments, the software and/or programs implementing the method embodiments can be read from hard disk drive (not illustrated) and temporarily stored in RAM (532) by CPU (522). CPU (522) may then read the software and/or data from RAM (532), process them, and store them to RAM (532) again.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

For the purposes of this disclosure, the term "user," "subscriber," "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by a processor, a script, the script including commands to access a composite dataset, the composite dataset comprising a plurality of datasets, the plurality of datasets including a raw dataset and one or more annotation datasets, the one or more annotation datasets created independent of the raw dataset;
   pre-processing, by the processor, an intermediate representation of the script to identify a set of columns associated with the composite dataset, wherein, pre-processing the script comprises generating a directed acyclic graph as the intermediate representation and identifying one or more column names included in the commands based on the directed acyclic graph;
   loading, by the processor, a metadata file associated with the composite dataset, the metadata file including an algebraic representation defining relationships among the plurality of datasets, the loading comprising identifying file paths associated with the plurality of datasets and loading data from files stored at the file paths;
   parsing, by the processor, the algebraic representation to identify one or more datasets that include a column in the set of columns, the one or more datasets comprising a subset of the plurality of datasets;
   loading, by the processor, data from the one or more datasets; and
   executing, by the processor, the script on the one or more datasets.

2. The method of claim 1, wherein parsing the metadata file comprises identifying one or more dataset objects stored within the metadata file; and extracting schemas associated with each of the one or more dataset objects.

3. The method of claim 2, wherein parsing the metadata file further comprises identifying a schema in the schemas that includes at least one column in the set of columns.

4. The method of claim 1, wherein executing the script comprises combining the one or more datasets to form a second composite dataset and using the second composite dataset while executing the script.

5. The method of claim 1, further comprising executing a predicate push down procedure prior to loading the data.

6. A non-transitory computer-readable storage medium for tangibly storing computer program instructions capable of being executed by a computer processor, the computer program instructions defining steps of:
   receiving a script, the script including commands to access a composite dataset, the composite dataset comprising a plurality of datasets, the plurality of datasets including a raw dataset and one or more annotation datasets, the one or more annotation datasets created independent of the raw dataset;
   pre-processing an intermediate representation of the script to identify a set of columns associated with the composite dataset,
   wherein, pre-processing the script comprises generating a directed acyclic graph as the intermediate representation and identifying one or more column names included in the commands based on the directed acyclic graph;
   loading a metadata file associated with the composite dataset, the metadata file including an algebraic representation defining relationships among the plurality of datasets, the loading comprising identifying file paths associated with the plurality of datasets and loading data from files stored at the file paths;
   parsing the algebraic representation to identify one or more datasets that include a column in the set of columns, the one or more datasets comprising a subset of the plurality of datasets;
   loading data from the one or more datasets; and
   executing the script on the one or more datasets.

7. The non-transitory computer-readable storage medium of claim 6, wherein parsing the metadata file comprises identifying one or more dataset objects stored within the metadata file; and extracting schemas associated with each of the one or more dataset objects.

8. The non-transitory computer-readable storage medium of claim 7, wherein parsing the metadata file further comprises identifying a schema in the schemas that includes at least one column in the set of columns.

9. The non-transitory computer-readable storage medium of claim 6, wherein executing the script comprises combining the one or more datasets to form a second composite dataset and using the second composite dataset while executing the script.

10. The non-transitory computer-readable storage medium of claim 6, further comprising executing a predicate push down procedure prior to loading the data.

11. An apparatus comprising:
    a processor; and
    a storage medium for tangibly storing thereon program logic for execution by the processor, the program logic causing the processor to perform operations of:
    receiving a script, the script including commands to access a composite dataset, the composite dataset comprising a plurality of datasets, the plurality of datasets including a raw dataset and one or more annotation datasets, the one or more annotation datasets created independent of the raw dataset;
    pre-processing an intermediate representation of the script to identify a set of columns associated with the composite dataset,
    wherein, pre-processing the script comprises generating a directed acyclic graph as the intermediate representation and identifying one or more column names included in the commands based on the directed acyclic graph;
    loading a metadata file associated with the composite dataset, the metadata file including an algebraic representation defining relationships among the plurality of datasets, the loading comprising identifying file paths associated with the plurality of datasets and loading data from files stored at the file paths;
    parsing the algebraic representation to identify one or more datasets that include a column in the set of columns, the one or more datasets comprising a subset of the plurality of datasets;

loading data from the one or more datasets; and executing the script on the one or more datasets.

12. The apparatus of claim 11, wherein parsing the metadata file comprises identifying one or more dataset objects stored within the metadata file; and extracting schemas associated with each of the one or more dataset objects.

13. The apparatus of claim 12, wherein parsing the metadata file further comprises identifying a schema in the schemas that includes at least one column in the set of columns.

14. The apparatus of claim 11, wherein executing the script comprises combining the one or more datasets to form a second composite dataset and using the second composite dataset while executing the script.

* * * * *